United States Patent [19]

Eidson

[11] Patent Number: 4,534,486
[45] Date of Patent: Aug. 13, 1985

[54] COVER PLATE FASTENING DEVICE

[76] Inventor: Lawrence E. Eidson, 33586 Breckenridge, Sterling Heights, Mich. 48077

[21] Appl. No.: 594,839

[22] Filed: Mar. 29, 1984

[51] Int. Cl.³ .............................................. N02H 3/14
[52] U.S. Cl. ..................................... 220/241; 174/66; 24/296
[58] Field of Search ...................... 220/241, 242, 326; 174/66; 24/293, 296, 545; 200/333

[56] References Cited

U.S. PATENT DOCUMENTS

| | | | |
|---|---|---|---|
| 2,057,588 | 10/1938 | Place | 24/296 |
| 2,215,428 | 9/1940 | Place | 24/296 |
| 3,155,808 | 11/1964 | Wiley | 200/172 |
| 3,197,549 | 7/1965 | Good | 174/66 |
| 3,619,477 | 11/1971 | Rasmussen | 220/241 |
| 3,648,878 | 3/1972 | Mackay et al. | 220/4 |
| 4,359,619 | 11/1982 | Bergoltz | 200/241 |

Primary Examiner—George T. Hall
Attorney, Agent, or Firm—Gifford, VanOphem, Sheridan, Sprinkle & Nabozny

[57] ABSTRACT

A fastener for connecting a cover plate to an electrical box housing comprises a prong secured to a base which is attached to the rear face of the cover plate. The fastener comprises a prong having a compressible, radially expanded portion which is received within an aperture formed in the electrical box housing. The expanded portion is resiliently urged toward a radial dimension exceeding the diameter of the aperture so that the prong can be tightly engaged within a bore or behind an aperture in a plate. The fastener can be easily attached to previously known cover plates by glueing, welding, or the like. However, the preferred construction of the fastener comprises a filiform element bent to form a planar base and a prong extending substantially perpendicular to the base, and wherein the base is secured to the rear face of the cover plate.

20 Claims, 8 Drawing Figures

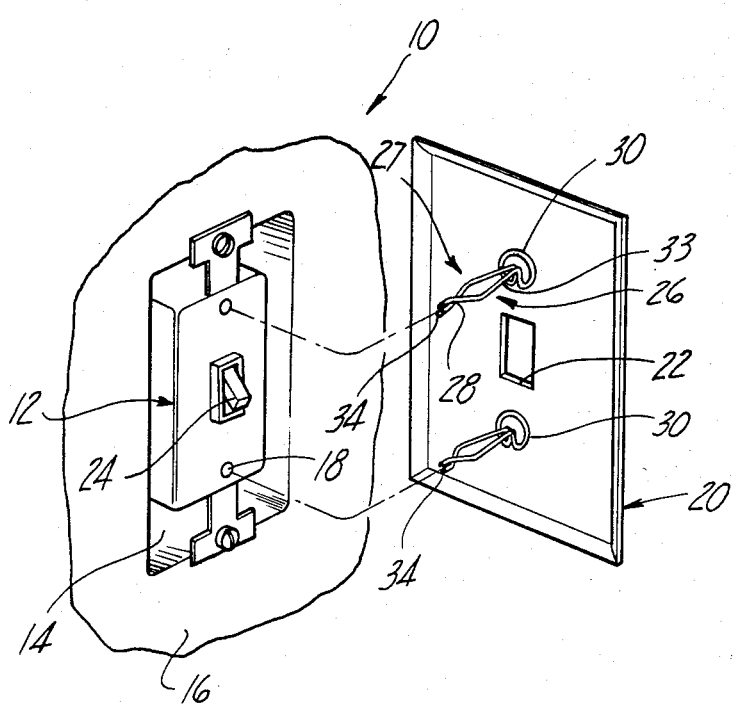
*Fig-1*
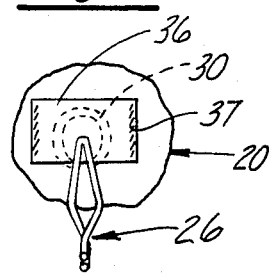
*Fig-2*
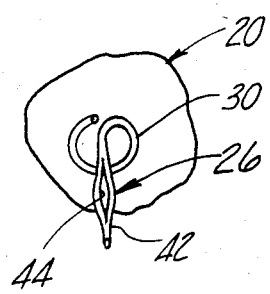
*Fig-3*
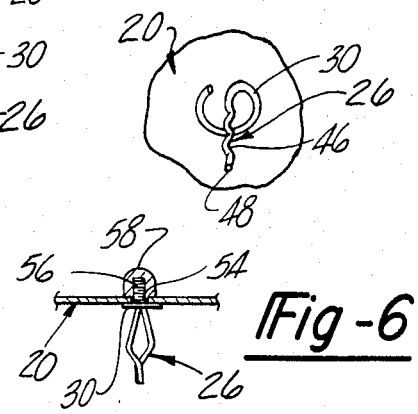
*Fig-4*
*Fig-6*
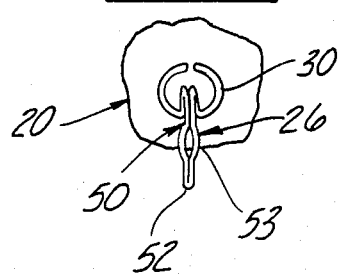
*Fig-5*
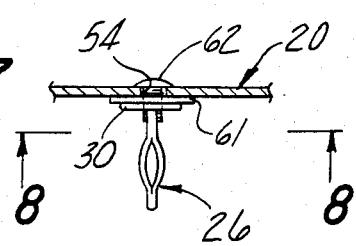
*Fig-7*
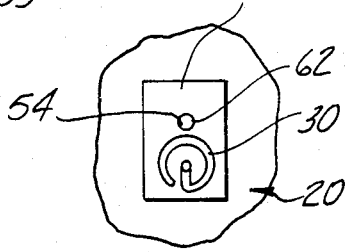
*Fig-8*

COVER PLATE FASTENING DEVICE

BACKGROUND OF THE INVENTION

1. Field of the Present Invention

The present invention relates generally to support housings for electrical outlets and switches and more particularly to the means for attaching a cover plate to a wall mounted electrical box housing.

2. Description of the Prior Art

Wall mounted electrical box housings for switches, plug outlets and the like are often covered by a cover plate which extends over the hole in the wall in which the electrical box is mounted. Such cover plates often include apertures of a desired shape and size to permit exposure of electrical outlet or switch levers through the opening so that the outlets or levers remain accesible for use. The most common means for securing the cover plate to the electrical box housing is to provide the cover plate with mounting apertures adapted to receive a threaded fastener which extends through the mounting apertures in the cover plate and is threadably engaged within apertures of threaded bores formed in the electrical box housing. The threaded fasteners are typically headed screws which require the use of a screwdriver to install and remove the cover plate. Moreover, the production of threaded apertures in the electrical box housing substantially increases the cost and complexity of production of the electrical box housing. Nevertheless, it is important that the cover plate remain stably secured to the electrical box housing to avoid exposure of the hole in the wall around the electrical box housing and to protect the electrical components supported therein.

Since it is desirable to remove the cover plates when the building walls are being painted or when the electrical circuitry in the electrical box housing is being repaired or inspected, the commonly utilized screw type attachments for the cover plates prolong the time necessary to complete the work. Moreover, withdrawal and installation of the screws through the cover plates requires the use of a tool such as a screwdriver, and thus further prolongs and complicates the task of removing the cover plates.

Although there have been some previously known detachable cover plates which do not require the use of tools, these devices also suffer the disadvantage of complicated construction, and are not often applicable to the existing electrical box housings which are in common use. For example, U.S. Pat. No. 3,155,808 to Wiley discloses a fastener for a cover plate in which the cover plate is provided with a pair of projections adapted to be received in specially constructed apertures in the switch housing. Although the construction of the projections is rather simple, the apertures in the housing must be provided with a rim having radially inwardly extending barbs in order to retain the projections within the aperture. Such a construction requires mating construction of both the cover plate and the housing and thus increases the cost and complexity for each of the components. Morevoer such a cover plate is not interchangeable with previously known cover plates for covering the commonly utilized electrical box housings.

SUMMARY OF THE PRESENT INVENTION

The present invention overcomes the above-mentioned disadvantages by providing a snap-fastening arrangement for attaching cover plates to electrical box housings. In general, the fastener comprises an elongated prong in the form of a spring clip adapted to be secured to the rear face of the cover plate in alignment with apertures provided on the electrical box housing for attachment of a cover plate. Unlike previously known snap-fasteners for attaching cover plates to electrical box housings, the prongs are adapted to be received in the existing threaded openings provided in previously known electrical box housings commonly utilized. Nevertheless, the fastener does not require threaded openings and, thus, the labor and time necessary to provide threaded apertures in newly manufactured electrical box housings are eliminated by the present invention. Thus the fastener substantially reduces the cost and complexity of producing electrical box housings. Moreover, it avoids the need for modifying previously known electrical box housings to form special fastener receiving sockets.

The fastener of the present invention generally comprises an elongated prong having a compressible, radially expanded portion and a means for securing the prong to the cover plate so that it extends outwardly from the rear face of the cover plate. The prong can be conveniently formed in numerous ways and several constructions for the prong are described in greater detail hereinafter. In addition, the means for attaching the prong to the cover plate could include means for utilizing the mounting aperture on previously constructed cover plates so that cover plates which were previously attached by screws to previously known electrical box housings can now be mounted by a snap-on fitting to the previously existing housing. It is to be understood, however, that the cover plate is preferably constructed to be mounted by fasteners in accordance with the present invention. The combination of a cover plate form without mounting apertures but including prongs constructed in accordance with the present invention provides a smooth, finished appearance on the outside of the cover plate, as well as the advantage of easy installation and removal. Although the fastener, and the cover plate if desired, can be formed of plastic, metal, or other materials, it is only necessary that the material itself or other means resiliently maintain a radial dimension at a portion of the prong greater than the diameter of the aperture into which the prong is to be inserted. Nevertheless, constructing the prong of a material which normally retains its shape and can be compressed substantially reduces the cost and complexity of the fastening device according to the present invention.

BRIEF DESCRIPTION OF THE DRAWING

The present invention will be more clearly understood by reference to the following detailed description of the present invention when read in conjunction with the accompanying drawing in which like reference characters refer to like parts throughout the view, and in which:

FIG. 1 is an exploded perspective view of a device constructed in accordance with the present invention;

FIG. 2 is a perspective view of portion of the device shown in FIG. 1 but showing a modification thereof;

FIG. 3 is a perspective view similar to FIG. 2 but showing a further modification thereof;

FIG. 4 is a perspective view similar to FIGS. 2 and 3 but showing another modification thereof;

FIG. 5 is an enlarged perspective view similar to FIGS. 2-4 showing a still further modification thereof;

FIG. 6 is a sectional elevation of cover plate fastener constructed in accordance with the present invention;

FIG. 7 is a sectional elevation similar to FIG. 6 but showing further modification according to the present invention; and FIG. 8 is an elevational view as seen substantially from line 8—8 of FIG. 7.

DETAILED DESCRIPTION OF THE PREFERRED EMBODIMENT OF THE PRESENT INVENTION

Referring first to FIG. 1, an electrical switch cover plate connection 10 according to the present invention is thereshown comprising electrical switch box housing 12 mounted in an opening 14 in a wall structure 16. The housing 12 includes apertures 18 facing outwardly from the wall structure. These apertures 18 can be provided by the previously known threaded apertures commonly employed in the previously known switch box housings for attachment of cover plates. Nevertheless, it will be understood that apertures 18 need not be threaded in order to be operative in accordance with the teachings of the present invention.

A cover plate 20 is formed without mounting holes to provide a smooth ornamental outer appearance and is appropriately sized to conveniently cover the opening 14 in wall structure 16. The plate 20 includes a central aperture 22 adapted to receive the centrally mounted switch lever 24 of the switch box housing 12. Of course, it will be understood that the cover plate 20 can have other arrangements of apertures 22 as is necessary to complement the switch box housing. For example, it will be understood that if the electrical box housing included a pair of plug receiving outlets, the plate 20 would include apertures adapted to register with the plug outlets. In any event, cover plate 20 shown in FIG. 1 includes a pair of prongs 26 aligned for insertion into the apertures 18 in the switch box housing 12.

As shown in FIG. 1, prong 26 includes filiform element 28 bent or curved to define a base 30 lying in a plane substantially perpendicular to a pair of legs 33 extending outwardly from the base 30. The base 30 is secured to the rear face of the cover plate 20 by appropriate means such as glue, (not shown) welds 37 (FIG. 2) or other appropriate means which will be discussed in greater detail hereinafter. An expanded portion 27 of the prong is formed by bends in legs 33. The legs 33 curve so as to be spaced outwardly apart from each other at 27 and inwardly toward each other near their free ends so that the straight end portions, lay against each other. Of course, the legs have a diameter substantially less than the apertures 18 so that the straight ends form a tip 34 which can be received within an aperture 18 to guide the prong during insertion into an aperture 18. The unconnected ends of the filiform elements can cross each other when insertion causes the prong to compress to fit within the apertures 18. Nevertheless, the resiliency of the legs 18 urges the expanded portion 27 of the prong 26 to expand toward a radial dimension wider than the diameter of the apertures 18. As a result, the expanded portion 27 of the prong 26 is pressed against the peripheral wall of the aperture 18 and thereby secures the cover plate 20 against the wall 16 over the switch box housing 12.

Referring now to FIG. 2, a modified version of the prong 26 is thereshown in which the base 30 is secured to the cover plate 20 by insertion beneath a flange member 36 secured to the rear face of cover plate 20. As shown in FIG. 2, the flange member 36 is fixedly secured to plate 20 as by welds 37 although one side of the flange member 36 remains open to permit insertion of the base 30. The flange member 36 is positioned so that insertion of the base 30 under the flange member 36 positions the prong 26 for registration with an aperture 18 when the cover plate is placed over an electrical box housing 12.

Referring now to FIG. 3, prong 26 is thereshown formed from a single filiform element 42 having a diametrical slit 44 extending along an axial portion of the element 42. One end of the element 42 is secured to the base 30 and the free end of the element 42 remains in filiform shape. Portions of the element 42 adjacent the slit 44 are expanded radially outwardly so as to normally maintain a breadth wider than the diameter of the apertures 18 so that, like the previously discussed prong structure, the prong is insertable into but tightly engageable within the apertures 18. One end of the element 42 circularly bent to form the base 30 which can be mounted to the cover plate 20 in an appropriate manner such as those discussed above.

FIG. 4 discloses further modification of the prong 26 in which the prong is formed from a single filiform element 46 having a wave-like shape, whereby the consecutive peaks of the wave form shape define a radial dimension on the prong which is wider than the diameter of the apertures 18. Nevertheless, the straight end 48 of the filiform element 46 enables the prongs to be easily received within the aperture 18 so as to initiate insertion of prong 26 within the aperture 18. The peaks are compressed as the prong 26 becomes engaged within aperture 18.

Referring now to FIG. 5, a still further modification of the prong 26 is thereshown comprising a single filiform element 50 which has been return-bent and has its free ends circularly formed in the same plane to form the base 30. At the return-bent end 52, the filiform element 50 is bent upon itself so as to form a narrow tip for the prong 26 which can initially penetrate the aperture 18. The substantially parallel legs formed by return bending the filiform element 50 are spread apart at an intermediate portion of prong 26 to define a compressible, radially expanded portion 53 adapted to tightly engage the periphery of the aperture 18.

Referring now to FIG. 6, the base 30 of the prong 26 is shown as a member separate from the cover plate 20 which is secured to cover plate 20 through an aperture 54 in the cover plate 20. The aperture 54 can, of course, be formed in the cover plate at a position where the prong 26 will be aligned with apertures 18 when the plate 20 is aligned over the opening 14. It should therefore be understood that aperture 54 may be the mounting hole which exists in previously known cover plates which are attached to a switch housing by screws. A threaded stem 56 is fixedly secured to the base 30 to extend through the aperture 54. The stem 56 is engaged by a cover nut 58 to provide a finished appearance to the cover plate 20 and secure the prong 26 to the cover plate 20 in an appropriate position at which the prongs are aligned with the apertures 18 in the switch box housing 12 when cover plate 20 is positioned over the housing and wall opening 14.

As shown in FIGS. 7 and 8, the base 30 can also include a plate 61 secured across the threaded aperture 54 adapted to receive a screw such as the screws previously used for attaching a previously known cover plate to the switch box housing. Screw 62 extends through the aperture 54 in the cover plate 20 and provides an outward appearance similar to the previously utilized cover plate fastening structure.

Nevertheless, it will be understood that whichever of the prong constructions in accordance with the present invention are utilized, the fastener permits the cover plate to be detachably snap-locked with the switch box housing so as to stably retain the cover plate in position over the opening 14 in the wall structure. Whenever desired, cover plate 20 can be removed by merely pulling the cover plate away from the wall structure 16 so that the prongs 26 secured thereto are extracted from the apertures 18. Of course, regardless of whether the expanded portions of the prongs 26 engage the periphery of a bore within the electrical box housing or whether they expand radially beyond the perimeter of an aperture in a plate-like structure in the housing, it will be understood that the prong stably retains the cover plate in position over the electrical box housing.

It should also be understood that although it has been preferred to illustrate a cover for a single switch or outlet a cover could be provided which would be suitable for use with multiple switches or outlets or combinations of these.

Having thus described my invention, many modifications thereto will become apparent to those skilled in the art to which it pertains without departing from the scope and spirit of the present invention as defined in the appended claims.

I claim:

1. A snap-on cover for electrical boxes having at least one aperture adapted to threadably engage a threaded fastener, said cover comprising;
   a cover plate having a front face and a rear face and at least one elongated prong extending outwardly from the rear face of said cover plate, each said prong having a compressible, radially expanded portion, and means for resiliently urging said compressible expanded portion to a radial dimension larger than the diameter of said aperture, and
   means for securing each said prong to said cover plate so that each said prong is axially aligned with said aperture and so that said compressible, radially expanded portion is insertable within said aperture.

2. The invention as defined in claim 1 wherein said prong comprises a filiform element.

3. The invention as defined in claim 2 wherein at least a portion of said filiform element is bent in a wave shape.

4. The invention as defined in claim 1 wherein said filiform element is bent to define a pair of legs, and wherein said legs are bent outwardly from each other along at least a portion of said prong.

5. The invention as defined in claim 1 wherein said prong comprises a filiform element having a diametrical slit extending axially along a portion of said element, and wherein the portions of said element adjacent said slit are bent radially outwardly.

6. The invention as defined in claim 1 wherein said securing means comprises a base secured to one axial end of each prong and means for mounting said base to said plate.

7. The invention as defined in claim 6 wherein said mounting means comprises a flange member and means for securing said flange member to the back side of said plate so that one edge of said flange member detached from said back side to define an opening intermediate said flange member and said cover plate adapted to receive at least a portion of said base therein.

8. The invention as defined in claim 6 wherein said plate includes at least one plate aperture adapted to be positioned in registration with said aperture in said electrical housing box and further comprising means for attaching said base to said plate at said plate aperture.

9. The invention as defined in claim 3 wherein said base prong comprises a filiform element and said base comprises a curved portion of said filiform element lying in a plane substantially perpendicular to said prong.

10. The combination of an electrical box housing having at least one housing aperture adapted to threadably engage a fastener, and a cover plate having at least one plate aperture registering with said at least one housing aperture, the improvement comprising,
    means for detachably securing said cover plate to said electrical box housing, wherein said means comprises;
    at least one elongated prong having a compressible, radially expanded portion and means for resiliently urging said radially expanded portion to a radial dimension greater than the diameter of at least one housing aperture, and
    means for securing each said prong to said cover plate in alignment with said plate aperture so that each said prong is insertable within one of said housing apertures.

11. The invention as defined in claim 10 wherein said securing means comprises a base secured to one end of each said prongs and means for attaching said base to said cover plate.

12. The invention as defined in claim 1 wherein said prong comprises a filiform element and wherein said base comprises a portion of said filiform element curved in a plane lying substantially perpendicular to said prong.

13. The invention as defined in claim 10 wherein attaching means comprises means for attaching said base to said cover through said plate aperture.

14. The invention as defined in claim 10 wherein said prong comprises a filiform element bent to define a pair of legs, and wherein said legs are bent outwardly from each other along at least a portion of said prong.

15. A fastener for detachably securing a substantially flat cover plate to an electrical box housing, the cover plate having a face surface and a rear surface the housing having at least one outwardly opening aperture, said fastener comprising:
    an elongated prong having a compressible, radially expanded portion with a radial dimension greater than the diameter of the outwardly opening aperture,
    a base secured to one end of said prong, and
    means for securing said base to the cover so that said prong wholly extends outwardly from the rear face of said cover plate in alignment with said outwardly opening aperture.

16. The invention as defined in claim 15 wherein said prong comprises a filiform element and wherein a portion of said filiform element is bent to form a substantially planar base and said prong extends substantially perpendicular to said base.

17. The invention as defined in claim 15 wherein said prong comprises a filiform element bent to define a pair of legs and wherein said legs are bent outwardly from each other along at least a portion of said prong.

18. The invention as defined in claim 15 wherein said prong comprises a return-bent filiform element forming a pair of legs, each leg having a flared, intermediate portion.

19. The invention as defined in claim 15 wherein the free end of each filiform element is angled toward the free end of the other filiform element.

20. The invention as defined in claim 15 wherein said cover plate includes at least one plate aperture and wherein said securing means comprises means for attaching said base to said cover through said at least one plate aperture.

* * * * *